Nov. 14, 1967   A. LOWERY ETAL   3,353,023
SAFETY SHIELDING STRUCTURE FOR PORTABLE NUCLEAR GAUGE
Filed Nov. 1, 1963   3 Sheets-Sheet 1

INVENTORS
Andrew Lowery
David B. Auld
Robert W. Faulkner
ATTORNEY

Nov. 14, 1967 A. LOWERY ETAL 3,353,023
SAFETY SHIELDING STRUCTURE FOR PORTABLE NUCLEAR GAUGE
Filed Nov. 1, 1963 3 Sheets-Sheet 2

INVENTORS
Andrew Lowery
David B. Auld
Robert W. Faulkner
ATTORNEY

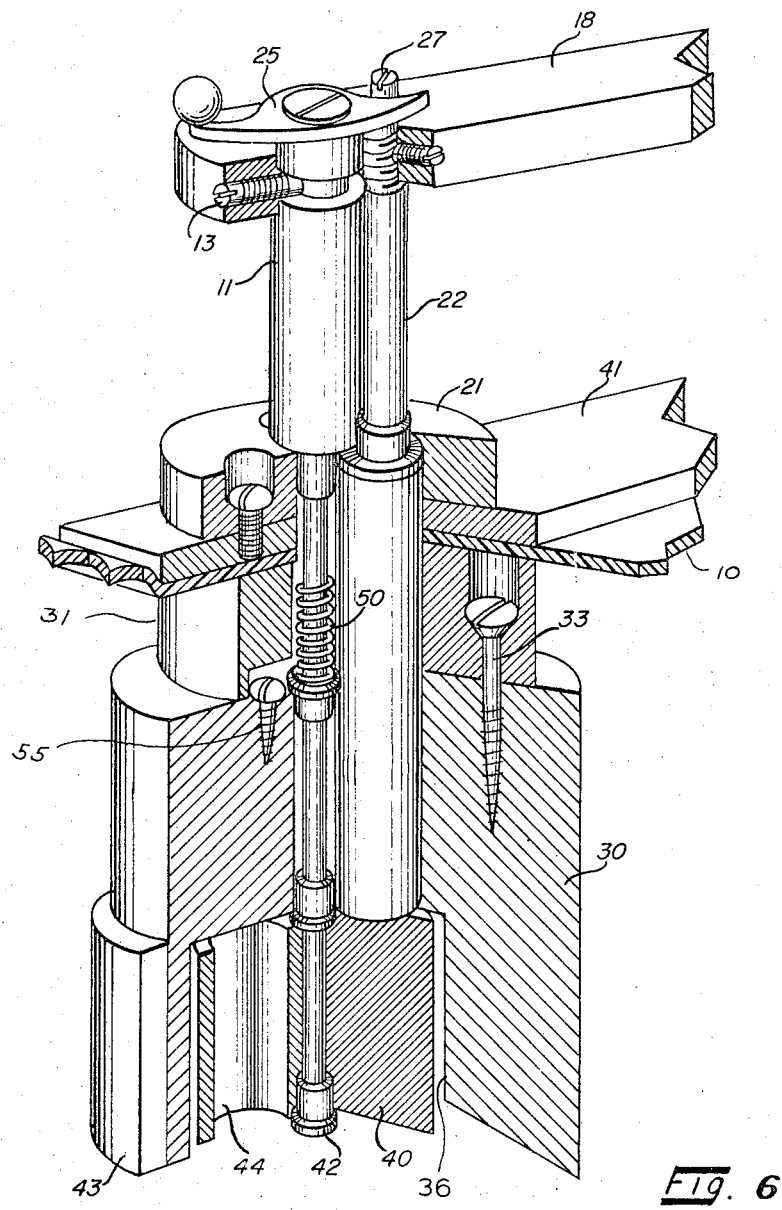

United States Patent Office 3,353,023
Patented Nov. 14, 1967

3,353,023
SAFETY SHIELDING STRUCTURE FOR
PORTABLE NUCLEAR GAUGE
Andrew Lowery, Durham, and David B. Auld and Robert
W. Faulkner, Raleigh, N.C., assignors to Troxler Electronic Laboratories, Inc., Raleigh, N.C., a corporation of North Carolina
Filed Nov. 1, 1963, Ser. No. 320,899
1 Claim. (Cl. 250—106)

This invention relates generally to nuclear measuring instruments and, more particularly, to portable nuclear density gauges for determining the density of materials such as soils and concrete without disturbing the surface of the material being measured.

Many of the new measuring devices or gauges developed in recent years use radioactive source material as a means for measuring density, moisture content, composition, and the like. Of course, it is always important in such devices that the operating personnel be shielded from the radioactive material so as to prevent radiation injuries. Particularly where the device is made as a portable unit and safety practices are loose, it becomes increasingly important to design the device in a form which encourages safe use of the radioactive material. For example, where a radioactive material is above ground and is unshielded, considerable physical harm may result if the operator has a close and prolonged exposure to the radioactive material.

In certain nuclear instruments which are commercially available, the radioactive source material is contained within a solid probe which is mounted so that it can be lowered into a hole in the material to be measured. When the probe is retracted, it is contained within a lead block which shields the radioactive material on the sides, while the probe itself shields the material on the top and bottom. Such a device is described in more detail in a copending United States patent application bearing Ser. No. 290,539, entitled, "Safety Handle for Portable Surface Gauge Using Radioactive Source," filed June 25, 1963, now abandoned, continuation application Ser. No. 560,396 of the same title filed Jan. 20, 1966, and assigned to the assignee of the present application.

In nuclear measuring devices, the backscatter technique is used to make the desired measurements by positioning the radioactive source next to the surface of the material to be measured without passing the source below the material surface. In such devices, the radioactive source is necessarily mounted on the very end or surface of the supporting member so that the source is next to the surface of the material to be measured when the source is lowered to its advanced or operating position. Thus, a movable shielding means must be provided to shield the bottom of the source when it is in the retracted position. Moreover, it is desirable from a safety standpoint that the source be retracted and that the movable shielding means be moved into shielding position before the instrument can be moved, thereby protecting the operator from harmful radiation.

It is, therefore, the main object of the present invention to provide an improved nuclear measuring device which uses the backscatter technique to make the desired measurements.

It is another object of the invention to provide an improved shielding structure for such a device.

A further object is to provide such a device wherein the radioactive source material must be retracted before the device can be lifted by its handle.

A still further object is to provide such a device wherein retraction of the source automatically moves the movable shielding member into position to shield the bottom of the source.

Other aims and advantages of the invention will be apparent from the following description and appended claims:

In the drawings:

FIG. 6 is an enlarged fragmentary perspective, partially in section, showing the main internal structure of the device of FIG. 1.

Figure 1:
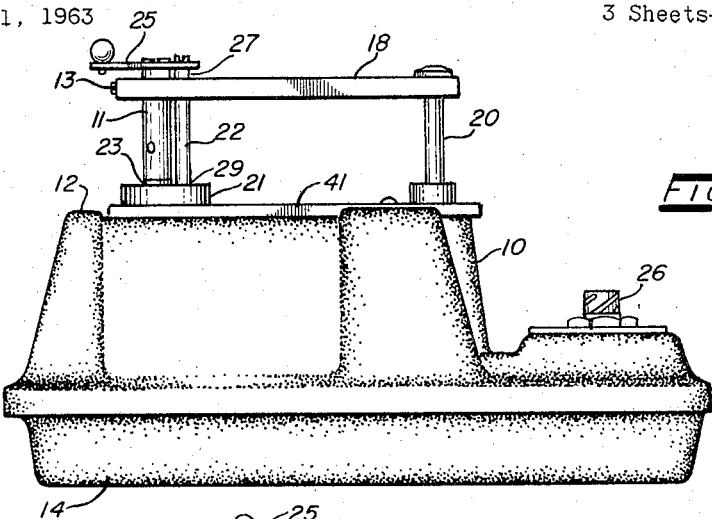
FIG. 1 is a side elevation of a nuclear density gauge embodying the invention.

In accordance with the present invention, there is provided a nuclear measuring device comprising a first radiation-shielding member having a vertical passageway therethrough; an elongated rod vertically disposed within the passageway and a radioactive material mounted on the lower end of the rod; means for lowering the rod through the passageway to an advanced position and for raising the rod through the passageway to a retracted position; a movable second radiation-shielding member having an open portion adapted to be aligned with the lower end of the passageway when the second shielding member is moved to a first position, the second member also having a solid portion adapted to cover the lower end of the passageway when the second member is moved to a second position; and means for automatically moving the second shielding member to said second position when the rod is raised to the retracted position.

The invention will be described in more detail by referring to the preferred embodiment illustrated in the drawings.

Figure 2:
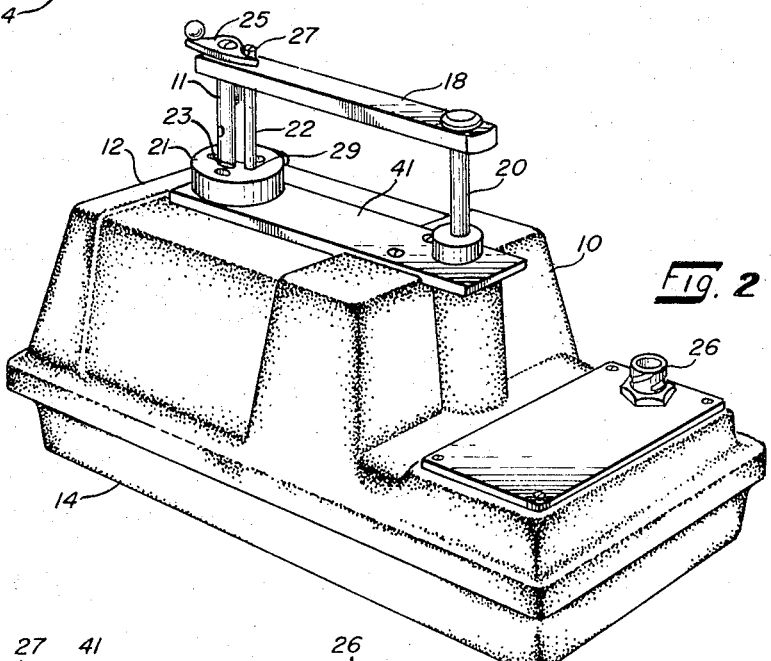
FIGS. 2 and 3 are perspective and top plan views, respectively, of the gauge shown in FIG. 1.
Figure 3:
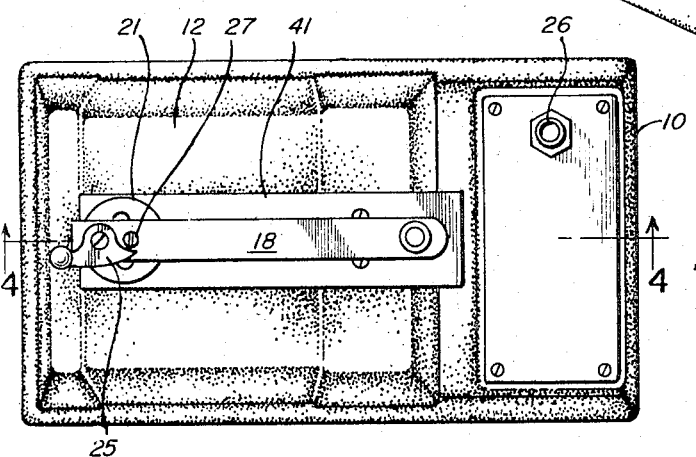

The device illustrated in the drawings is a portable nuclear density gauge for measuring the density of materials by the backscatter technique without disturbing the surface of the material being measured. Referring first to FIGS. 1–3, the exterior of the illustrated gauge generally comprises a housing 10 including a top wall 12 and a bottom wall 14; a rigid base plate 41 secured to the top of the housing 10; a collar 21 and a vertical slide rod 20 mounted on opposite ends of the base plate 41; a drive rod head 11 rotatably mounted on the collar 21; a handle 18 slidably mounted on the drive rod head 11 and the slide rod 20; and an elongated source rod 22 rigidly connected to the handle 18 and extending downwardly therefrom through a bushing 29 in the collar 21 and into the housing 10.

The rotatable drive rod head 11 is secured by suitable means to an elongated drive rod 16 (see FIG. 4) which extends downwardly through a bushing 23 in the collar 21 and into the housing 10. A small arm 25 is bolted to the top of the head 11 so that the head 11 and the drive rod 16 can be manually rotated. A vertical post 27 is secured to the top of the handle 18 to stop the rotation of the arm at predetermined positions, as described in more detail hereinafter. As can be seen in FIGS. 2 and 3, the arm 25 projects radially outwardly from opposite sides of the head 11 so the arm can be rotated approximately 180° between stop positions.

Figure 4:
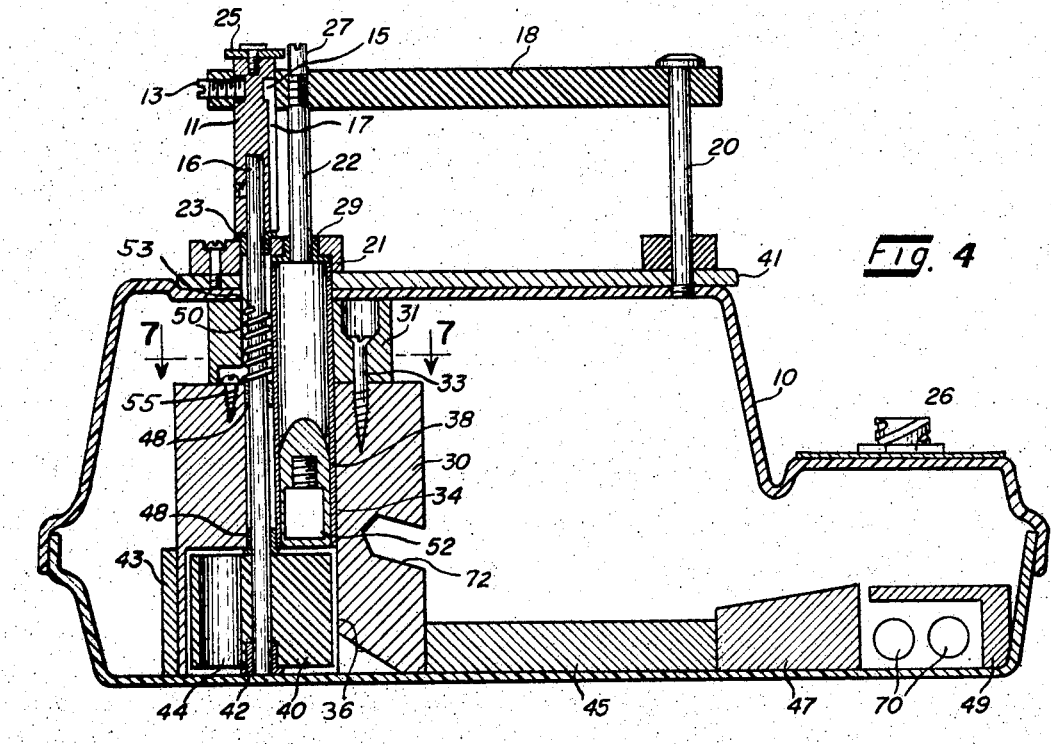
FIG. 4 is a vertical section of the device of FIG. 1 taken along line 4—4 of FIG. 3 showing the handle and the radioactive source in the raised position and the movable shielding member in its shielding position.

Referring next to FIGS. 4 and 6, the interior of the device includes a stationary radiation-shielding block 30 and supplementary shielding members 43 and 45, suitably made of lead, glued to the bottom of the housing 10, and a spacer 31 secured to the top of the block 30, as by screws 33. The spacer 31 extends all the way to the top wall of the housing 10 so as to hold the block 30 firmly in place. An alternative structure would be to extend the block 30 itself all the way to the top wall of the housing 10 and omit the spacer 31. The shielding block 30 is provided with a vertical passageway 34 aligned with the center opening in the spacer 31, and the lower end of the passageway 34 opens into a circular cavity 36 in the lower surface of the block 30.

Figure 7:
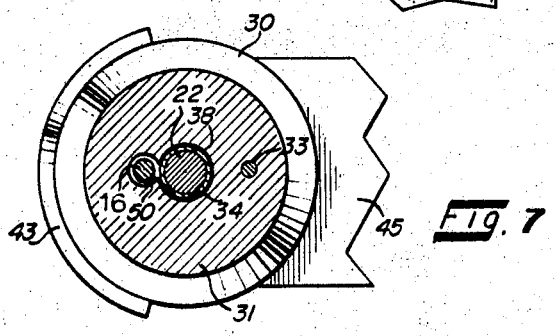
FIG. 7 is a full horizontal section taken along line 7—7 in FIG. 4.

As can be seen in FIG. 7, both the center opening in the spacer 31 and the matching passageway 34 in the block 30 are shaped to receive the vertical drive rod 16 and the source rod 22. The source rod is contained within a vertical guide tube 38 which extends from the collar 21 down through the spacer 31 and the upper portion of the block 30. Thus, it will be seen that the source rod 22 can be moved vertically through the tube 38 by manually sliding the handle 18 up and down on the head 11 and the rod 20.

Adjacent tube 38 there is fitted a pair of bushings 48 which receive and guide the rotatable drive rod 16. The lower portion of the rod 16 extends downwardly through the center of the circular cavity 36 and terminates in a bushing 42. Bushing 42 is secured to the guide rod 16 and to the bottom of the disc 40, preferably by glue, thereby enabling disc 40, rod 16 and bushing 42 to rotate as an integral unit. Contained within the circular cavity 36 of the block 30 and secured to the rotatable drive rod 16 therein is a radiation-shielding disc 40. The lower surface of the disc 40 is held a small distance above the bottom wall of the housing 10 by means of the bushing 42. The disc 40, which is suitably made of a heavy metal, such as lead, is provided with a circular opening 44 extending vertically through one side of the disc. The opening 44 has a diameter approximately the same as the inside diameter of the tube 38, and is positioned so as to be aligned with the lower end of the tube 38 when the disc 40 is rotated to a first position. When the disc 40 is rotated to a second position, as shown in FIGS. 4 and 6, the solid portion of the disc 40 covers the lower end of the tube 38 and shields the radioactive material therein. In other words, the first position is the open or non-shielding position, while the second position is the closed or shielding position.

Figure 5:
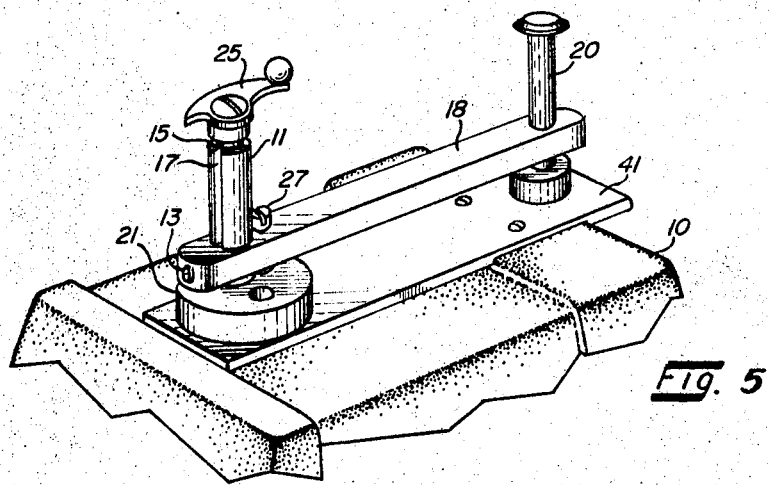
FIG. 5 is an enlarged fragmentary perspective of the device of FIG. 1 showing the handle in its lowered position.

Still referring to FIG. 4, a radioactive source 52 is threaded onto the lower end of the source rod 22. The radioactive material 52 serves as the source of the gamma rays or other radiation used in the measuring method, and typical source materials are cesium–137 and radium–226. As shown in FIGS. 4 and 6, when the handle 18 and the rod 22 are in the raised position, the source 52 is in its retracted position where it is completely shielded by the block 30 on the sides, the rod 22 on the top, and the disc 40 on the bottom. When the handle 18 and the rod 22 are lowered, as illustrated in FIG. 5, the source 52 is in its advanced position within the opening 44 where the source is still shielded on the top and sides but not on the bottom. Of course, the measurements are made while the source 52 is in its advanced position with the material to be measured placed against the bottom wall of the housing 10.

Just above the top surface of the block 30, a coil spring 50 is placed around the rod 16 with the upper end of the spring attached to the rod 16, as at 53, and the lower end of the spring attached to the stationary block 30 by means of a screw 55. The spring 50 is tensioned such that it always tends to rotate the rod 16 and the disc 40 to the stop position shown in FIGS. 4 and 6, i.e., with the solid portion of the disc 40 covering the lower end of the tube 38. The entire interior of the device around the block 30 is preferably filled with a plastic foam in order to provide additional structural strength and rigidity to the device.

In the operation of the apparatus described thus far, the device is first placed in position with at least that portion of the housing directly below the source 52 resting on the surface of the material to be measured. The arm 25 is then manually rotated approximately 180° so that the knobbed portion of the arm strikes the post 27, thereby rotating the disc 40 to its first position where the opening 44 is aligned with the tube 38. The arm 25 is then held in this position while the handle 18 is manually lowered against the plate 41 so as to advance the rod 22 and the source 52 into the opening 44, thereby positioning the source 52 next to the bottom wall of the housing 10. Of course, as soon as the rod 22 enters the opening 44 of the disc 40, the rod 22 holds the disc 40 at its first position and the arm 25 can be released. After the desired measurements have been made, the handle 18 is raised to its original position, thereby raising the rod 22 and the source 52 back to the retracted position shown in FIGS. 4 and 6. As soon as the source 52 is raised above the disc 40, the spring 50 automatically rotates the disc 40 to its second position where the solid portion of the disc covers the tube 38, as in FIGS. 4 and 6. Thus, it can be seen that the illustrated device not only provides a unique shielding mechanism which shields the bottom of the source when the source is in its retracted position, but also provides an automatic safety mechanism which insures that the source will be completely shielded before the device can be conveniently lifted and transported to a new location. In other words, the handle 18 is useless as a handle while the source is in its lowered unshielded position, and is useful as a handle only when the source is in its retracted shielded position.

When the source 52 is lowered to its advanced position, measurement of the gamma count is made by appropriate photomultiplier or Geiger-Mueller tubes 70 mounted on the bottom of the housing 10. The electrical connections with the tubes 70 are made through a connector 26 mounted on the housing 10 above the tubes. Radiation-shielding members 47 and 49 are provided adjacent the tubes 70 to prevent spurious responses from sources outside the instrument, and a reference hole 72 is provided in the block 30 adjacent the retracted position of the source 52 to permit the taking of a standard count. Since this invention is primarily concerned with the shielding, source, and handle mechanisms and not with the counting circuitry, such circuitry is not described in detail herein.

In order to prevent the operator from lowering the handle 18 and forcing the source 52 against the relatively soft lead disc 40 before the disc opening 44 has been aligned with the tube 38, a keying arrangement is provided between the handle 18 and the guide rod head 11. As shown most clearly in FIG. 4, the end of the handle 18 adjacent the guide rod head 11 is provided with a key 13 which rides in a circumferential keyway 15 and an axial keyway 17 in the head 11. The circumferential keyway 15 permits rotation of the head 11 by the arm 25 only when the handle 18 is in its raised position, while the vertical axial keyway 17 is located such that it is aligned with the key 13 only when the arm 25 has been rotated to align the disc opening 44 with the tube 38. Thus, if the operator attempts to lower the handle 18 before the disc 40 has been rotated to its first or open position, the applied force will be exerted against the head 11 by the key 13 rather than against the lead disc 40 by the source 52. When the disc 40 has been properly rotated to the open position, however, the handle can be freely lowered with the key 13 riding down the vertical keyway 17. This keying action also locks the rod 16 and the disc 40 firmly in place while the handle 18 is being raised and lowered and while the handle is in its lowered position.

While one specific form of the invention has been illustrated and described herein in some detail, it will be apparent that the same is susceptible of numerous modifications within the scope of the invention.

What is claimed is:

In a portable nuclear measuring device:

(a) a housing including top and bottom walls;

(b) a vertically extending radiation shielding block mounted within said housing and secured to said bottom wall, said block having a vertical passageway formed in the upper and central portion thereof and communicating therewith a cylindrical cavity formed in the lower and lateral portion thereof;

(c) an elongated probe rod slidably mounted within said passageway for movement along a vertical axis laterally offset from the central vertical axis of said cavity, said probe rod including a radioactive source mounted on its lower end and having its upper end extending through and above said top wall;

(d) a radiation shielding cylinder mounted within and substantially filling said cylindrical cavity and being rotatable around the said central vertical axis thereof, said cylinder being substantially solid except for a vertical opening provided therethrough, the size of said opening being selected and the axis thereof being laterally offset from the axis of said cylinder such that when said cylinder is rotated to a first position the axis of said probe rod and opening coincide and said opening is positioned to slidably receive said probe rod for vertical movement of said source downwardly to a measuring position adjacent said bottom wall and when said source is positioned above said cylinder and said cylinder is rotated to a second position the solid portion of said cylinder shields said source;

(e) a vertically positioned elongated drive rod centrally mounting said shielding cylinder and rotatable therewith, said drive rod being adjacent said probe rod and extending through said passageway upwardly through and above said top wall and including a vertical groove along the length thereof and a connecting horizontal groove at the top thereof;

(f) singular spring means secured to said drive rod and effective to constantly force said drive rod in a direction to bring said cylinder into said second shielding position;

(g) a horizontally positioned bar handle rigidly connected to the upper end of said probe rod above said top wall and movable with said probe rod for positioning of said source within said opening, said handle being slidably mounted on said drive rod and including horizontally positioned pin means arranged to engage the said horizontal groove in said drive rod and maintain said handle and said probe rod in a fixed raised position for transport and said source in said shielded position when said cylinder and drive rod positions correspond to said second position and to engage and slide vertically in said vertical groove in said drive rod only when said cylinder and drive rod positions correspond to said first position; and (h) auxiliary handle means mounted on said drive rod above said handle for manually rotating said drive rod and cylinder between said first and second positions.

References Cited

UNITED STATES PATENTS

| | | | |
|---|---|---|---|
| 2,941,079 | 6/1960 | Lucas | 250—106 |
| 2,998,527 | 8/1961 | Shevick | 250—106 |
| 3,126,484 | 3/1964 | Meeder | 250—106 |

OTHER REFERENCES

First addition 71,328 of French Patent 1,149,712, 12/1959, 250—106S.

RALPH G. NILSON, *Primary Examiner.*

JAMES W. LAWRENCE, *Examiner.*

S. ELBAUM, *Assistant Examiner.*